Oct. 11, 1949.   H. E. HARTIG   2,484,790
ELECTRIC MOTOR FOLLOW-UP SYSTEM
Filed July 10, 1943   2 Sheets-Sheet 1
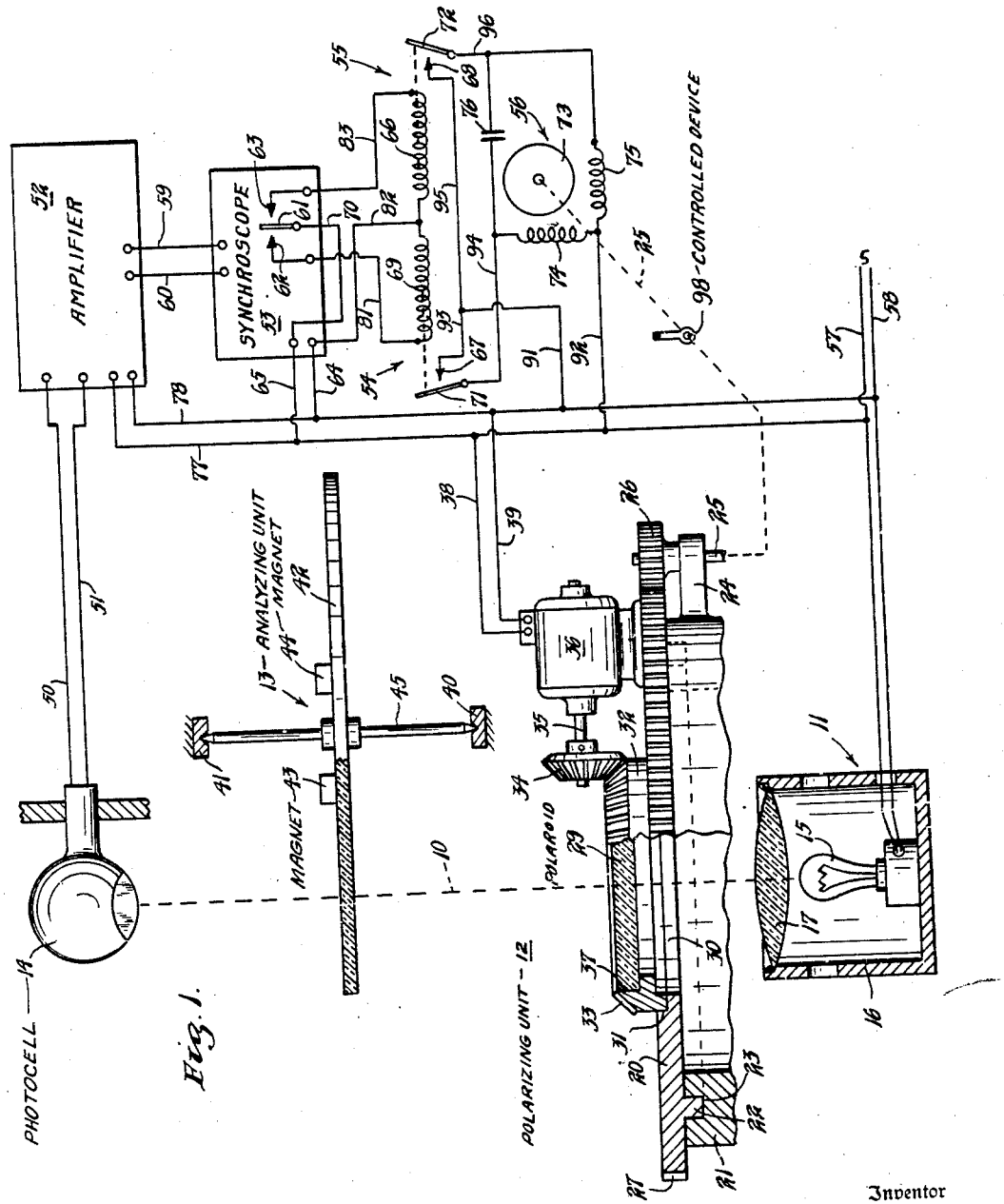
Inventor
HENRY E. HARTIG.
By George H. Fisher
Attorney

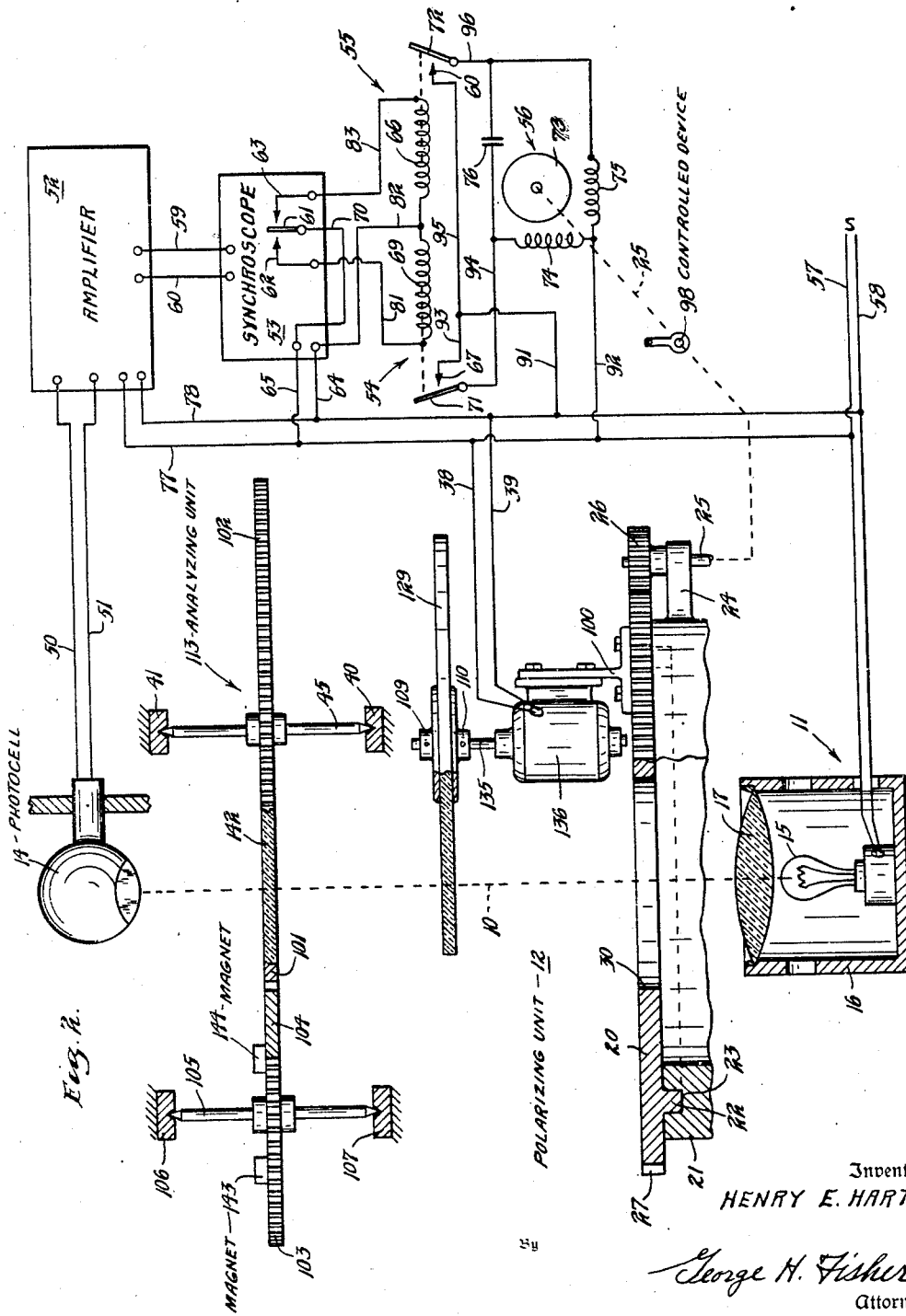

Patented Oct. 11, 1949

2,484,790

UNITED STATES PATENT OFFICE 2,484,790

ELECTRIC MOTOR FOLLOW-UP SYSTEM

Henry E. Hartig, Robbinsdale, Minn., assignor to Minneapolis-Honeywell Regulator Company, Minneapolis, Minn., a corporation of Delaware Application July 10, 1943, Serial No. 494,180

17 Claims. (Cl. 318—31)

This invention relates to control apparatus and more particularly to devices in which the position of a continuously rotatable member is made effective at a distance to actuate an indicator or to operate any device which it is desired to make responsive to the angular position of the rotatable member. Since the invention is particularly adapted for use as a remotely indicating means with a magnetic compass, my preferred embodiment of the invention discloses it in association with such a compass, but it will be readily understood that the invention is adapted to be associated with any rotating member which it may be desired to use as a controller.

Devices for broadly making effective at a distance changes in the position for example of a compass needle are known, but these devices are subject to various difficulties as will hereinafter be pointed out. A particular disability from which all previous compass devices of this sort have suffered lies in the fact that no satisfactory means have heretofore been discovered in which the mechanism is selectively responsive to change in the position of the rotatable member at any position throughout its entire range of rotation. It is an object of this invention to overcome this disability in a novel fashion.

An object of this invention is to provide an improved remotely indicating or operating compass.

Another object of this invention is to provide an improved optical system for continuously transmitting the angular position of a continuously rotatable member.

Still another object of this invention is to provide a remotely indicating or operating device which is continuously responsive to change in the angular position of the controlling member.

A further object of this invention is to provide a remotely indicating or operating compass which is continuously responsive to change in the angular position of the controlling magnetic member.

It is another object of this invention to provide, in conjunction with cyclically movable means having a plurality of spaced equivalent positions and with means continuously responsive to a continuously variable condition, further means for associating the movable means with the responsive means and for preventing lag, between the variation in the condition and the response of the responsive member, from causing confusion among the equivalent positions of the movable means.

It is a further object of this invention to provide control means, having a pair of equivalent, rotatively spaced positions, and a continuously responsively rotatable member associated therewith in such a fashion that confusion between the euivalent positions cannot occur.

A still further object of this invention is to provide an electrical generator for the generation of alternating current by sinusoidally varying the intensity of light impinging upon a photoelectric cell.

Yet another object of this invention is to provide an optical system in which a continuously rotatable beam of plane polarized light is directed through a responsively rotatable analyzing member and thereafter impinges upon a photoelectric cell.

Various other objects, advantages and features of novelty which characterize my invention are pointed out with particularity in the claims annexed to and forming a part of this invention. However, for a better understanding of the invention, its advantages and objects attained with its use, reference should be had to the subjoined drawing which forms a further part of this specification and to the accompanying descriptive matter, in which I have illustrated and described certain preferred embodiments of the invention, and in which Figure 1 is a diagrammatic showing of one modification of my invention, and Figure 2 is a similar diagrammatic showing of a second modification of my invention.

Structure of Figure 1

In Figure 1, certain members of one unit of my invention are mounted along an axis 10 and comprise a source of illumination generally indicated by numeral 11, a polarizing unit generally indicated by numeral 12, an analyzing unit generally indicated by numeral 13, and a photocell generally indicated by numeral 14. Member 11 comprises a lamp 15 which may be of any conventional type giving a substantially uniform intensity of illumination, and may further be mounted in a housing 16 in such relation to a lens 17 as to direct light along the axis 10.

Axially spaced from member 11 is the polarizing unit 12 comprising a plate 20 arranged for rotation around axis 10 with respect to a fixed support 21, as by an annular rim 22 projecting from plate 20 and interrelating with an annular groove 23 in support 21. A boss 24 projecting from base 21 is bored to receive a shaft 25 carrying a gear 26. The teeth in gear 26 are arranged to cooperate with gear teeth 27 cut in the outer rim of plate 20.

A large axial opening 30 is formed in the center of plate 20, and an annular recess 31 is provided communicating with the opening for receiving a ring member 32 in rotating relationship therewith. The upper portion of ring 32 is provided with bevel gear teeth as at 33 for cooperating with the bevelled gear 34 on a shaft 35 of a synchronous motor 36 having two poles. Motor 36 is provided with current by any conventional means, not shown in detail but generally indicated by conductors 38 and 39, and is mounted on plate 20 with which it rotates about axis 10.

Ring 32 is inwardly recessed as at 37, to receive a disc 29 of material having the property of plane-polarizing light passing through it. I prefer to use a sheet of the substance commercially known as "Polaroid" for this material. The speed of the shaft 35 of motor 36 is the same as the frequency of the electricity providing energy for the motor, as will be set forth in more detail later.

Axially spaced from polarizing unit 12 is analyzer unit 13. This comprises a second sheet 42 of the polarizing material to which material I have referred above, mounted for rotation about an axis passing through bearings 40 and 41 by means of a shaft 45. A pair of magnetic members 43 and 44 are mounted on plate 42 for rotation therewith and for causing rotation thereof, with their north poles extending in the same direction.

Axially spaced from analyzing unit 13 is photoelectric cell 14 arranged to receive light from lamp 15 transmitted through lens 17 and discs 29 and 42.

A system embodying my invention includes, as illustrated, certain other devices in addition to the members described above, which comprise what I refer to generally as my pick-up unit. These additional devices include an amplifier 52, a synchroscope 53, relays 54 and 55 and a motor 56. Electrical energy is supplied to the system by conductors 57 and 58, to which conductors 38 and 39 are connected. A synchroscope suitable for use in the practice of my invention is illustrated and described on pages 198 and 199 of the seventh edition of the "Standard Handbook for Electrical Engineers," edited by Archer E. Knowlton and published in 1941. The indicator arm of the otherwise standard synchroscope is replaced by an electrical contact arm 61 rotatably adjustable on the shaft of the synchroscope and having a position between a pair of fixed contacts 62 and 63 in which it makes electrical contact with neither. The output of the amplifier is connected as by conductors 59 and 60 to one of the windings of synchroscope 53, while the other winding of the synchroscope is connected to the source of electric energy by conductors 64 and 65.

Relays 54 and 55 are comprised of coils 69 and 66, fixed contacts 67 and 68 and contact arms 71 and 72, all respectively. Contact arms 71 and 72 are biased out of engagement with contacts 67 and 68 by gravity or any suitable biasing means. In the normal position of these relays the contacts are thus arranged to open the circuits in which they are connected.

Motor 56 is comprised of an armature 73, field windings 74 and 75, and a capacitor 76 and is provided with electrical energy by conductors 91 and 92.

Amplifier 52 may be of any conventional type, and is provided with electrical energy by conductors 77 and 78. Conductors 50 and 51 lead from the photoelectric cell to the input terminals of the amplifier.

*Operation of Figure 1*

The operation of my system will now be described. It will readily be understood that when the polarizing plane of the material comprising disc 29 is aligned with that of disc 42, the maximum intensity of light illumination is transmitted from lamp 15 to photocell 14. It will also be apparent that when the two discs have been relatively rotated through 90° the minimum intensity of light is transmitted from lamp 15 to photocell 14. Assuming that disc 42 is maintained stationary against rotation, it will be apparent that for each single rotation of disc 29 about axis 10, two maxima and two minima of photoelectric current pass through conductors 50 and 51 leading from the photocell. If now the tooth ratio between gears 33 and 34 is two to one, the number of light maxima per second becomes the same as the number of revolutions per second of shaft 35 of motor 36. Synchronous motor 36, being connected through conductors 38, 39, 78 and 77 to conductors 57 and 58, operates at the same number of revolutions per second as the number of cycles per second of the alternating current being applied to the system through conductors 57 and 58. The currents in the two pairs of conductors 50, 51 and 77, 78 are thus of the same frequency and of a constant phase difference. Suitable initial arrangement of disc 29 in ring 32 makes it possible for this phase angle to be reduced to zero. Under these conditions, proper adjustment of the potential gain in the amplifier causes the alternating potentials impressed upon the respective coils of synchroscope 53 by conductors 59 and 60 from the photocell, and conductors 64 and 65 from the line respectively, to be of the same amplitude and in the same phase, and the synchroscope shaft does not tend to rotate in either direction.

Now let the disc 42 be rotated through an angle θ. Under these conditions, the polarizing plane of disc 29 is aligned with that of disc 42 θ degrees sooner or later in each revolution of ring 32 than previously. This means that the light maxima impinging on the photocell 14 occur θ degrees sooner or later, and therefore that the current impressed on one winding of synchroscope 53 by conductors 59 and 60 leads or lags that impressed on the other winding by conductors 64 and 65 by θ degrees. The shaft of the synchroscope attempts to rotate right or left to indicate this leading or lagging phase angle, and being mechanically connected to contact arm 61 so as to cause closure of 61 and 62 or 61 and 63, depending on the sense of the synchroscope rotation, this rotation establishes one of the two following circuits, depending on the sense of the initial phase unbalance caused by the rotation of disc 42. From the source of electrical energy, by conductor 69 and conductor 70 to contact arm 61, to fixed contact 62, by conductor 81 to coil 69 of relay 54, and thence by conductor 82 and conductor 64 back to the source of electrical energy. Or, from the source of electrical energy by conductors 65 and 70 to contact arm 61, to fixed contact 63, thence by conductor 83 to coil 66 of relay 55, and thence by conductors 82 and 64 back to the source of electrical energy.

The former circuit operates relay 54, closing a circuit between contact arm 71 and contact 67 and supplying energy to motor 56 through the following circuit: conductors 91 and 93, fixed contact 67, contact arm 71, conductor 94, motor

16, conductor 82 and back to the source of electrical energy. It will be seen that in this connection electrical energy is provided through the winding 74 of motor 56 directly and to the winding 75 of motor 56 through capacitor 76. This arrangement produces a phase displacement of 90 degrees between the current in field windings 74 and 75, and causes rotation of the motor in a definite direction.

The latter circuit operates relay 55 closing a circuit to motor 56 as follows: conductors 91 and 95, fixed contact 68, contact arm 72, conductor 86 to motor 56, thence by conductor 92 back to the source of electrical energy. In this circuit it will be seen that current is provided to coil 75 of motor 56 directly and to field winding 74 of motor 56 through capacitor 76, again producing a phase displacement of 90° between the currents in the field windings but this time in the opposite direction, causing rotation of the motor also in the opposite direction. Shaft 25 of motor 56 is connected to gear 26 in such fashion that rotation of the motor in each of these cases is in such a direction as to decrease the angle between the polarizing plane of discs 29 and 42.

The method of operation of my device will now be apparent. Let it be assumed that my device is to be used as a compass in a craft, for example, in aircraft. Then the compass is installed in the craft at a time when the axis of the craft is in a magnetically north and south direction, adjusted to a position at which no response is made by the motor 56, and rigidly fixed against rotation with respect to the craft. Then so long as the craft maintains its axis in a magnetically north and south direction, electrical energy is not supplied to motor 56, and the motor does not operate. However, let the axis of the craft deviate from a magnetically north and south direction and interaction between the magnetic field of the earth and the fields of magnetic members 43 and 44 causes rotation of disc 42 around its axis with respect to its support. This, as I have outlined above, causes a shift in phase between the two sources of electrical energy impressed upon the synchroscope, and makes a contact operating one of the two relays whereby to energize the motor into operation in the desired direction. Operation of the motor, through a period of time sufficient to cause the plane of polarization of disc 29 to again come into alignment with that of disc 42 at a time causing coincidence of the light maxima, with the voltage maxima returns the phase angle between the two currents impressed on the synchroscope to zero, and energization of motor 56 is interrupted.

It is obvious that any desired indicator 98 may be actuated by motor 56 through an appropriate train of gears or other mechanical linkage to indicate exactly the angle through which disc 20 has been rotated by motor 56 and hence to indicate the angle of deviation of the axis of the craft from its magnetically north and south direction. It will also be obvious that for some intended uses of devices similar to that described, the mechanical follow-up provided by shaft 25, gear 26, and gear 27 may be obviated, by the expedient of having motor 56 operate suitable control devices such, for example, as the rudder bar of the craft in question. Under these conditions, operation of the motor brings about a change in the heading of the craft which reestablishes the alignment between the planes of polarization of discs 42 and 29.

Structure of Figure 2

It will be obvious from a consideration of the disclosure of Figure 1 that if the member 42 becomes out of phase with member 29 by 180°, the two members are again in phase, since member 42 has no ability to perceive a difference of 180°. This is because the planes of polarization are parallel at 0°, 180°, 360°, and so forth. In cases where the device may be required to keep up with exceedingly rapid rotational changes which must be followed by members 43 and 44, error may be introduced by this effect. The modification I have disclosed in Figure 2 is designed to avoid this difficulty.

Referring now to Figure 2, it will be seen that I have disclosed a modification of my invention differing in several respects from that disclosed in Figure 1, but having the same underlying principle of operation. In the two figures, it will be seen that I have used the same reference numerals to refer to the same elements, and that the principal differences are, first, in the method of producing rotation of the polarizing member, and second, in the method of causing responsive rotation of the analyzing member. The structure of Figure 2 is as follows:

Mounted upon member 20 is an angle bracket 100 arranged to support a synchronous motor 136. Motor 136 is made with four poles: the speed of shaft 135 will therefore be half the frequency of the electrical energy provided through conductors 38 and 39. Rotation of shaft 135 causes rotation of a disk 129 of polarizing material in every respect analagous to disk 29 in Figure 1. Disk 129 may be fastened to shaft 135 as by collars 109 and 110.

In this modification it will be seen that disk 142 is provided with an external ring 101 in which gear teeth 102 are formed. Disk 142 is mounted on shaft 45 for rotation in bearings 41 and 40. Spaced from shaft 45 is a second shaft 105 mounted in bearings 106 and 107 and carrying a disk 104 of non-magnetic material having teeth 103 adapted to engage with teeth 102 in disk 42. Disk 104 carries magnetic members 143 and 144 so that rotation of disk 104 may be caused when the line parallel to the axes of members 143 and 144 deviates from true magnetic north. The number of teeth in disk 104 is half the number of teeth in ring 101; therefore, a complete revolution of member 104 is required to bring about a half revolution of disk 142. It will thus be seen that the magnetic members must lag the condition to which they are responsive by 360° before the discs 142 and 129 again are in a position identical with their initial position, and that a rotation of member 103 through 360° is a return of that member also to its zero position: 180° ambiguity is therefore impossible. This is the principle advantage of my second modification.

Operation of Figure 2

The modification disclosed in Figure 2 operates in a manner completely analagous to that just set forth. Because of the slightly different details of structure, the operation of this modification will be briefly described. Electrical energy supplied to motor 136 causes disk 129 to rotate at a fixed speed, which is one half the frequency of the energizing current. If disk 142 is motionless, this rotation of disk 129 causes large maxima and minima to impinge upon photocell 14 with a frequency equal to the frequency of the electrical current. Photoelectric currents pass through amplifier 52 and are impressed upon synchroscope 53, having a fixed phase angle, which may be reduced to zero as before, with the current provided through conductors 64 and 65 to synchroscope 53. Rotation of disk 104 in response to changes in the magnetic orientation of the device causes rotation of disk 142 through half the angle, producing, as described above, a phase difference between the potentials impressed on the synchroscope through conductors 60, 59 and 64, 65, respectively, causing rotation of the arm 61 and selective energizations of motor 56 as clearly set forth above.

It will be obvious that indicator 98 has a scale of different graduations in this case from that provided in the first modification, since due to the two-to-one ratio of the teeth in 103 to 102, only half as much rotation of motor 56 is required to bring the planes of polarization of disks 142 and 129 into parallelism again.

It will be understood that although I have shown in my preferred embodiment that my invention is especially adapted for use in connection with a compass, still my invention is also adapted for use wherever a member such as 42 may be associated with a rotating member whose angular position it is desired to use as a controlling condition. While I have shown and described a preferred embodiment of my invention herein, modifications will readily appear to those who are skilled in the art, and I therefore wish my invention to be limited only by the scope of the appended claims.

I claim as my invention:

1. Control apparatus comprising, in combination, a split phase motor having two windings, means supplying alternating voltage of a selected frequency to said windings in reversible 90 degree phase relationship, a generator providing a periodic voltage whose phase is continuously variable in response to a condition, phase shift responsive means reversing the phase relationship between the currents in said windings of said motor in accordance with opposite variations in the phase of said generator output, whereby said motor may be selectively operated in forward and reverse direction in response to opposite changes in said condition, said generator comprising a source of light, electrically light-responsive means, first and second rotatable members between said source and said means, said first mentioned member causing plane polarization of light from said source, said second member transmitting said plane polarized light to said light-responsive means in varying intensity in accordance with its relation to the direction of the plane of said polarization, means continuously rotating said first rotatable member to rotate the plane of said polarization, and means rotating said second rotatable member through an angle determined by said condition.

2. Control apparatus comprising, in combination, a split phase motor having two windings, means supplying alternating current of a selected frequency to said windings in reversible 90 degree phase relationship, a generator, comprising light-polarizing and polarized-light-analyzing means, providing an alternating voltage whose phase is continuously variable in response to a condition, phase shift responsive means varying the phase relationship between the currents in said windings of said motor in accordance with variations in the phase of said generator output, whereby said motor may be selectively operated in forward and reverse direction in response to opposite changes in said condition, said generator comprising a source directing a beam of light along an axis, a first rotatable member axially spaced from said source, said member causing plane polarization of said beam, a second rotatable member axially spaced from said first member, said second member transmitting said plane polarized light in variable intensity in accordance with its relation to the direction of the plane of said polarization, means continuously rotating said first member to cause continuous rotation of the plane of said polarization, means rotating said second member through an angle determined by said condition, means electrically responsive to the intensity of light falling thereon and axially spaced from said first and second members, whereby the intensity of light impinging upon said last mentioned means is varied in accordance with the angular relation between the first and second members about said axis, to photoelectrically generate a periodic voltage of a frequency determined by the angular velocity of said first member, and of a phase determined by the angular position of said second member.

3. Control apparatus, comprising a member responding to the phase relationship between alternating voltages of the same frequency, means supplying a standard alternating voltage of chosen frequency to said member, means supplying a second alternating voltage of said chosen frequency and of continuously variable phase to said member, and means actuated by variations in the response of said member for performing a control function, said second named means comprising means directing a beam of light along an axis, a synchronous motor, light-polarizing means driven by said motor for causing plane polarization of the light of said beam, operation of said motor causing rotation of the plane of polarization of said beam, electrically light responsive means supplying said second alternating voltage to said member upon impingement by light of sinusoidally variable intensity, polarized-light-analyzing means rotatably mounted in said beam between said light polarizing means and said light responsive means, whereby upon rotation of said polarizing means the intensity of light falling upon said light responsive means may be substantially sinusoidally varied, the speed of said motor being such that the frequency of the variation of said light is the same as the frequency of said standard alternating voltage, and means for causing rotation of said analyzing means in response to a condition, whereby to vary the phase of the response of said light responsive means with respect to said standard alternating voltage.

4. In a device of the class described, in combination: a source of alternating voltage of selected frequency, a member mounted for unlimited incremental change in direction in response to a condition; means including said member for providing a single phase alternating voltage of said selected frequency whose phase with respect to that of said source varies with change in the direction of said member; means responsive to this difference in phase between said voltages; control means actuated by said last named means; said first named means including means directing a beam of light along an axis, means causing plane polarization of said beam of light, means causing rotation of said beam about said axis; polarized light analyzing means comprising said member rotatably mounted to transmit said beam, and electrically light sensitive means mounted in the path of the beam transmitted by said light analyzing means.

5. In a device of the class described, in combination: a source of alternating voltage of selected frequency; a member mounted for unlimited incremental change in direction in response to a condition; means including said member for providing a single phase alternating voltage of said selected frequency whose phase with respect to that of said source is continuously variable with change in the position of said member; means responsive to the sense of the difference in phase between said voltages; motor means actuated by said last named means; said first named means including means directing a beam of light along an axis, light-polarizing means causing plane polarization of said beam of light, means causing primary rotation of said plane of polarization about said axis, polarized-light-analyzing means comprising said member rotatably mounted to transmit said beam, and electrically light sensitive means mounted in the path of the beam transmitted by said light analyzing means; and means causing secondary rotation of said polarizing beam about said axis.

6. Control apparatus comprising, in combination: a split phase motor having a plurality of windings; means supplying alternating voltage of a selected frequency to one of said windings; a light source, electrically light responsive means, an optical system comprising a rotatable light-polarizing component and a rotatable polarized-light-analyzing component, and means continuously rotating one of said components, all cooperating to provide a periodic voltage of said selected frequency; means rotating the other of the components of said optical system, in response to change in a variable condition, so as to vary the phase of said periodic voltage; means comparing the phase of said periodic voltage with that of said supplied voltage; and means energizing the other of said windings of said motor with alternating voltage in opposed 90 degree phase relations with said supplied voltage as the phase angle between said supplied voltage and said periodic voltage assumes leading and lagging relationships.

7. In a device of the class described, in combination: a source of light; first rotatable means causing plane polarization of light from said source; means causing rotation of the plane of said polarization; second rotatable means transmitting said polarized beam with an intensity determined by the alignment between the plane of polarization thereof and a plane traversing said second rotatable means; means causing rotation of said second rotatable means in response to a condition; means electrically responsive to the intensity of the light transmitted by said rotation means; said various means and said source cooperating to provide an alternating voltage output, from said last named means, which varies in phase with rotation of said second rotatable means; a body remote from said second rotatable means and movable independently thereof to be positioned in accordance with the position of said second rotatable means; motor means for positioning said body; and means energizing said motor means in accordance with the phase of said output voltage to position said remote body in accordance with the angular movement of said second rotatable means.

8. In a device of the class described, in combination: a source of light; electrically light responsive means exposed to said light; a pair of members interposed between said responsive means and said source and transmitting light in accordance with a characteristic thereof, first motor means causing said characteristic of the light transmitted by one member of said pair to continuously vary in a repeating cycle about a normal value; means responsive to a condition to vary the point in said cycle at which the other member of said pair is most transmissive to light of said characteristic; a device remote from said other member and said condition responsive means and movable independently of said other member and said condition responsive means to be positioned in accordance with said condition; motor means for positioning said device; and means connecting said light responsive means in controlling relation to said motor means to cause said motor means to position said remote device in accordance with the change in the point in the cycle at which said other member is most transmissive to light.

9. In a device of the class described, in combination: a source of alternating voltage of a selected frequency; a source of light; first rotatable means causing plane polarization of light from said source; first motor means, continuously energized from said source, for causing rotation of said plane of polarization at a speed proportional to said selected frequency; electrically light responsive means; second rotatable means transmitting said polarized light to said light responsive means with an intensity determined by the degree of alignment between a plane transversing said second rotatable means and said plane of polarization, so that the intensity of the illumination of said light responsive means varies cyclically at said selected frequency and in a normal phase relation thereto; means for rotating said second rotatable means in response to a condition so as to vary said phase relation between said alternating voltage and said intensity of illumination; a device to be positioned in accordance with the position of said second rotatable means; second motor means reversibly positioning said device; and means energizing said second motor means on departure of said phase relation from said normal state.

10. In a device of the class described, in combination: a source of alternating voltage of a selected frequency; a source of light; first rotatable means causing plane polarization of light from said source; first motor means, continuously energized from said source, for causing rotation of said plane polarization at a speed proportional to said selected frequency; electrically light responsive means; second rotatable means transmitting said polarized light to said light responsive means with an intensity determined by the degree of alignment between a plane transversing said second rotatable means and said plane of polarization, so that the intensity of the illumination of the said light responsive means varies cyclically at said selected frequency and in a normal phase relation thereto; means for rotating said second rotatable means in response to a condition so as to vary said phase relation between said alternating voltage and said intensity of illumination; a device to be positioned in accordance with the position of said second rotatable means; second motor means reversibly positioning said device; means energizing said second motor means on departure of said phase relation from said normal state, and means actuated by said second motor means for altering the rotation of said plane of polarization to restore the normal state of said phase relation.

11. In a device of the class described, in combination: a source of light; electrically light responsive means exposed to said light; a pair of members interposed between said means and said source and transmitting light in accordance with the degree of angular agreement between the members of said pair; first motor means causing continuous unidirectional angular motion of one of said members so as to vary, in a repeating cycle, the intensity of the light from said source reaching said light responsive means; means controlling the angular position of the other of said members so as to advance and retard said cycle, from a normal state, in response to opposite variations in a condition; a device to be positioned in accordance with the position of said other of said members; second motor means for positioning said device; and means, including said first named means, energizing said second motor means in response to departure of said cycle from said normal state.

12. In a device of the class described, in combination: a source of light; electrically light responsive means exposed to said light; a pair of members interposed between said means and said source and transmitting light in accordance with the degree of angular agreement between the members of said pair; first motor means causing continuous unidirectional angular motion of one of said members so as to vary, in a repeating cycle, the intensity of the light from said source reaching said light responsive means; means controlling the angular position of the other of said members so as to advance and retard said cycle, from a normal state, in response to opposite variations in a condition; a device to be positioned in accordance with the position of said other of said members; second motor means for positioning said device; and means actuated by said second motor means for altering said angular motion of said one of said members whereby to independently advance and retard said cycle to return the same to said normal state.

13. In a device of the class described, in combination: a source of light; electrically light responsive means exposed to said light; a pair of members interposed between said means and said source and transmitting light in accordance with the degree of angular agreement between the members of said pair; first motor means causing continuous unidirectional angular motion of one of said members so as to vary, in a repeating cycle, the intensity of the light from said source reaching said means; means controlling the angular position of the other of said members so as to advance and retard said cycle, from a normal state, in response to opposite variations in a condition; a device to be positioned in accordance with the position of said other of said members; second motor means for positioning said device; means, including said first named means, energizing said second motor means in response to departure of said cycle from said normal state, said last named means comprising means comparing the phases of two voltages of like frequency and performing opposite control functions as the two voltages are out of phase in opposite senses; means applying to said phase comparing means a voltage of said selected frequency and a voltage in phase with the output of said light responsive means; and motor control means energizing said second motor means for operation in opposite senses upon opposite performance of said control function by said phase comparing means.

14. Apparatus operative in accordance with angular movement of a controlling member in response to a condition, comprising said member, a load device movable independnetly of said controlling member, motor means connected in driving relation to said load device, means directing a beam of plane polarized light along an axis and continuously rotating the plane of polarization about said axis, electrically light-responsive means in the path of said beam, means located in said beam between said two last named means for angular movement to variably transmit said polarized light in accordance with the angular disposition of its plane of polarization, means mounting said last named means and said member in unitary angular movement in accordance with said condition, and electrical means selectively energizing said motor means for forward and reverse operation in accordance with the responses of said light responsive means to drive said load device in accordance with the movement of said member.

15. Apparatus operative in accordance with angular movement of a controlling member in response to a condition, comprising said member, an indicator, motor means connected in driving relation to said indicator, means directing a beam of plane polarized light along an axis and continuously rotating the plane of polarization about said axis, electrically light responsive means in the path of said beam, means located in said beam between said two last named means for angular movement to variably transmit said polarized light in accordance with the angular disposition of its plane of polarization, means mounting said last named means and said member for unitary angular movement, further means independently causing angular movement of said plane of polarization about said axis, and means connecting said motor means in driving relation to said last named means.

16. Apparatus operative in accordance with angular movement of a controlling member in response to a condition, comprising said member, means mounting said member for angular movement, a load device movable independently of said controlling member, motor means connected in driving relation to said load device, means directing a beam of plane polarized light along an axis and continuously rotating the plane of polarization about said axis, electrically light responsive means in the path of said beam, means located in said beam between said two last named means for angular movement to variably transmit said polarized light in accordance with the angular disposition of its plane of polarization, means mounting said last named means in driven relation to said first named mounting means for unitary angular movement therewith in accordance with said condition, and electrical means selectively energizing said motor means for forward and reverse operation in accordance with response of said light responsive means to drive said load device in accordance with the movement of said member.

17. Apparatus operative in accordance with angular movement of a controlling member in response to a condition, comprising said member, a load device movable independently of said controlling member, motor means connected in driving relation to said load device, means directing a beam of plane polarized light along an axis and continuously rotating the plane of polarization about said axis, electrically light responsive means in the path of said beam, means mounted for unlimited angular movement in said beam between said two last named means to variably transmit said polarized light in accordance with the angular disposition of its plane of polarization, means mounting said member on said last named means for causing movement of said last named means in accordance with said condition, and electrical means selectively energizing said motor means for forward and reverse operation in accordance with the responses of said light responsive means to drive said load device in accordance with the movement of said member.

HENRY E. HARTIG.

REFERENCES CITED

The following references are of record in the file of this patent:

UNITED STATES PATENTS

| Number | Name | Date |
| --- | --- | --- |
| 1,585,210 | Roux | May 10, 1926 |
| 1,731,264 | Potter | Oct. 15, 1929 |
| 1,774,458 | Tear | Aug. 26, 1930 |
| 1,987,441 | Hardy | Jan. 8, 1935 |
| 1,999,646 | Wittkuhns | Apr. 30, 1935 |
| 2,005,153 | Marks | June 18, 1935 |
| 2,047,609 | Antranikian | July 14, 1936 |
| 2,167,484 | Berry | July 25, 1939 |
| 2,183,725 | Seeley | Dec. 19, 1939 |
| 2,201,559 | Moseley | May 21, 1940 |
| 2,206,018 | Bechberger | July 2, 1940 |
| 2,244,362 | Hartig | June 3, 1941 |
| 2,254,022 | Whitaker | Aug. 26, 1941 |

FOREIGN PATENTS

| Number | Country | Date |
| --- | --- | --- |
| 250,946 | Great Britain | Apr. 16, 1925 |

Certificate of Correction

Patent No. 2,484,790 — October 11, 1949

HENRY E. HARTIG

It is hereby certified that error appears in the printed specification of the above numbered patent requiring correction as follows:

Column 12, line 18, for the words "in unitary" read *for unitary*;

and that the said Letters Patent should be read with this correction therein that the same may conform to the record of the case in the Patent Office.

Signed and sealed this 16th day of May, A. D. 1950.

[SEAL]

THOMAS F. MURPHY,
*Assistant Commissioner of Patents.*